(12) United States Patent
Rosenkrans et al.

(10) Patent No.: US 8,646,251 B2
(45) Date of Patent: Feb. 11, 2014

(54) FLUTTER SENSING SYSTEM FOR A GAS TURBINE ENGINE

(75) Inventors: William E. Rosenkrans, Columbia, CT (US); Robert J. Morris, Portland, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 13/346,082

(22) Filed: Jan. 9, 2012

(65) Prior Publication Data

US 2012/0110979 A1  May 10, 2012

Related U.S. Application Data

(63) Continuation of application No. 11/682,015, filed on Mar. 5, 2007.

(51) Int. Cl.
*F02K 1/18* (2006.01)

(52) U.S. Cl.
USPC ............ 60/242; 60/226.1; 60/226.3; 415/126

(58) Field of Classification Search
USPC .................. 415/17, 23, 26, 46, 49, 126, 127; 60/226.1, 226.3, 233, 242, 268, 771, 60/39.163
See application file for complete search history.

(56) References Cited

U.S. PATENT DOCUMENTS

| | | | |
|---|---|---|---|
| 3,779,010 A | 12/1973 | Chamay et al. | |
| 3,792,584 A * | 2/1974 | Klees | 60/204 |
| 3,820,719 A | 6/1974 | Clark | |
| 3,854,286 A * | 12/1974 | Klees | 60/204 |
| 4,043,121 A * | 8/1977 | Thomas et al. | 60/204 |
| 4,052,845 A * | 10/1977 | Tumavicus | 60/226.3 |
| 4,068,469 A | 1/1978 | Adamson | |
| 4,080,785 A * | 3/1978 | Koff et al. | 60/226.3 |
| 4,827,712 A * | 5/1989 | Coplin | 60/226.1 |
| 4,922,713 A | 5/1990 | Barbarin et al. | |
| 5,005,353 A | 4/1991 | Acton et al. | |
| 5,184,459 A * | 2/1993 | McAndrews | 60/226.3 |
| 5,478,199 A | 12/1995 | Gliebe | |
| 5,655,360 A | 8/1997 | Butler | |
| 5,778,659 A | 7/1998 | Duesler et al. | |
| 6,004,095 A * | 12/1999 | Waitz et al. | 415/119 |
| 6,195,982 B1 * | 3/2001 | Gysling et al. | 60/204 |
| 6,582,183 B2 * | 6/2003 | Eveker et al. | 415/1 |
| 6,820,410 B2 | 11/2004 | Lair | |
| 6,983,588 B2 | 1/2006 | Lair | |
| 7,004,047 B2 | 2/2006 | Rey et al. | |
| 7,021,042 B2 * | 4/2006 | Law | 60/226.1 |

(Continued)

OTHER PUBLICATIONS

Extended EP Search Report for Application No. EP 08 25 0728, dated Dec. 6, 2011.

(Continued)

*Primary Examiner* — Edward Look
*Assistant Examiner* — Aaron R Eastman
(74) *Attorney, Agent, or Firm* — Carlson, Gaskey & Olds

(57) ABSTRACT

An exemplary gas turbine engine assembly includes a fan casing within a nacelle, a variable area fan nozzle. A controller is operable to move the variable area fan nozzle to influence a discharge airflow area associated with the variable area fan nozzle in response to an airfoil flutter condition. A gear train reduces a rotational speed of a fan in the gas turbine engine relative to another portion of the gas turbine engine.

25 Claims, 4 Drawing Sheets

(56) References Cited

U.S. PATENT DOCUMENTS

| | | |
|---|---|---|
| 7,340,883 B2 | 3/2008 | Wood et al. |
| 7,644,575 B2 | 1/2010 | Wood et al. |
| 2002/0067988 A1 | 6/2002 | Angelis |
| 2004/0128978 A1 | 7/2004 | McCune et al. |
| 2004/0187476 A1 | 9/2004 | Lair |
| 2005/0039437 A1 | 2/2005 | Lair |
| 2005/0086927 A1* | 4/2005 | Lair et al. .................. 60/226.2 |
| 2008/0048398 A1 | 2/2008 | Baird et al. |
| 2008/0092548 A1 | 4/2008 | Morford et al. |
| 2008/0163606 A1 | 7/2008 | Cini et al. |
| 2009/0067993 A1 | 3/2009 | Roberge et al. |
| 2009/0090182 A1 | 4/2009 | Holmquist |
| 2009/0193789 A1 | 8/2009 | Pero |
| 2009/0208328 A1 | 8/2009 | Stern |
| 2009/0226303 A1 | 9/2009 | Grabowski et al. |
| 2009/0245997 A1 | 10/2009 | Hurtwitz et al. |
| 2009/0288386 A1 | 11/2009 | Marshall et al. |
| 2009/0320488 A1 | 12/2009 | Gilson et al. |
| 2010/0003121 A1* | 1/2010 | Berryann et al. .................. 415/1 |
| 2010/0005777 A1 | 1/2010 | Marshall |
| 2010/0043393 A1 | 2/2010 | Zamora et al. |
| 2010/0064659 A1 | 3/2010 | Wang |
| 2010/0068039 A1* | 3/2010 | Winter .......................... 415/145 |

OTHER PUBLICATIONS

David Clarke and Steve Bold, Materials Developments in Aeroengine Gas Turbines, Chapter 7, 2001 Institute of Physics Publishing Ltd.

* cited by examiner

FLUTTER SENSING SYSTEM FOR A GAS TURBINE ENGINE

CROSS-REFERENCE TO RELATED APPLICATIONS

This application is a continuation of U.S. patent application Ser. No. 11/682,015, which was filed on 5 Mar. 2007 and is incorporated herein by reference.

BACKGROUND OF THE INVENTION

This invention generally relates to a gas turbine engine, and more particularly to a flutter sensing system for a gas turbine engine.

Gas turbine engines typically include a compressor section, a combustor section and a turbine section. Air is pressurized in the compressor section and is mixed with fuel and burned in the combustor section to add energy to expand the air and accelerate the airflow into the turbine section. The hot combustion gases that exit the combustor section flow downstream through the turbine section, which extracts kinetic energy from the expanding gases and converts the energy into shaft horsepower to drive the compressor section.

In a turbofan gas turbine engine, for example, a fan section is included upstream of the compressor section. Combustion gases are discharged from the gas turbine engine through a core exhaust nozzle and fan air is discharged through an annular fan exhaust nozzle defined at least partially by a nacelle surrounding the core engine. A majority of propulsion thrust is provided by the pressurized fan air which is discharged through the fan exhaust nozzle, while the remaining thrust is provided from combustion gases discharged through the core exhaust nozzle.

A fan section, the compressor section and the turbine section may include multiple airfoils disposed circumferentially about an engine longitudinal centerline axis. At certain aircraft operating conditions, these airfoils may be subjected to flutter, or self-induced oscillations. The flutter conditions are caused by the interaction between adjacent airfoils. During fan flutter, aerodynamic forces couple with each airfoil's elastic and inertial forces, which may increase the kinetic energy of each airfoil and produce negative damping. The negative damping is enhanced where adjacent airfoils vibrate in unison. Disadvantageously, the airfoil oscillations caused by flutter may become so severe that fracture or failure of the airfoils is possible.

Methods are known for mitigating the negative effects of flutter. For example, many gas turbine engine systems include high pressure compressors having variable vane rows (i.e., vanes that are rotatable about a perpendicular axis relative to a longitudinal centerline axis of the gas turbine engine). The variable vane rows have been used effectively to schedule the engine around flutter conditions by controlling the angle of incidence of the airfoils relative to a direction of flowing airflow. Also, bleed or valve systems are known which bleed airflow downstream from the airfoils to throttle airflow and mitigate flutter. Additionally, airfoil designs are known which tailor a leading edge of each airfoil to obtain improved local airfoil incidence and adjacent airfoils having different natural frequencies. Finally, having inconsistent airfoil spacing in a forward stage varies the intermittent air pulses communicated to a following airfoil stage, thus reducing natural frequency excitation. Disadvantageously, all of these methods result in system compromises, small to moderate performance losses and may be expensive to incorporate into existing gas turbine engine systems.

Accordingly, it is desirable to provide a gas turbine engine having a closed-loop flutter sensing system which achieves reduced flutter operation and minimizes performance losses of the gas turbine engine.

SUMMARY OF THE INVENTION

A gas turbine engine assembly according to an exemplary embodiment of the present disclosure includes, among other things, a fan casing within a nacelle, a variable area fan nozzle. A controller is operable to move the variable area fan nozzle to influence a discharge airflow area associated with the variable area fan nozzle in response to an airfoil flutter condition. A gear train reduces a rotational speed of a fan in the gas turbine engine relative to another portion of the gas turbine engine.

In a further non-limiting embodiment of the foregoing turbine engine assembly embodiment, the gear train is a planetary gear train.

In a further non-limiting embodiment of either of the foregoing turbine engine assembly embodiments, the planetary gear system includes orbiting planet gears.

In a further non-limiting embodiment of any of the foregoing turbine engine assembly embodiments, the planetary gear system includes non-orbiting planet gears.

In a further non-limiting embodiment of any of the foregoing turbine engine assembly embodiments, the gear train has a constant gear ratio.

In a further non-limiting embodiment of any of the foregoing turbine engine assembly embodiments, the gear train reduces the rotational speed of the fan relative to a shaft of the gas turbine engine that is rotatably coupled to a low pressure compressor of the gas turbine engine.

In a further non-limiting embodiment of any of the foregoing turbine engine assembly embodiments, the gas turbine engine assembly includes a sensor that detects the airfoil flutter condition.

In a further non-limiting embodiment of any of the foregoing turbine engine assembly embodiments, the sensor is mounted to the fan casing adjacent to a blade tip area of a fan section.

In a further non-limiting embodiment of any of the foregoing turbine engine assembly embodiments, the airfoil flutter condition comprises self-induced oscillations simultaneously experienced by adjacent airfoils of the gas turbine engine system.

In a further non-limiting embodiment of any of the foregoing turbine engine assembly embodiments, the controller influences the discharge airflow area by moving the variable area fan nozzle between a first position having a first discharge airflow area and a second position having a second discharge airflow area greater than the first discharge airflow area in response the airfoil flutter condition.

In a further non-limiting embodiment of any of the foregoing turbine engine assembly embodiments, the discharge airflow area extends between the variable area fan nozzle and a core engine casing.

A gas turbine engine assembly according to an exemplary embodiment of the present disclosure includes, among other things, a nacelle, a fan casing within the nacelle, a variable area fan nozzle moveable to influence a discharge airflow area associated with the variable area fan nozzle, a fan section within the fan casing, a compressor section and a turbine section positioned downstream of the fan section, a combustor section positioned between the compressor section and the turbine section, A controller operable to move the variable area fan nozzle in response to the detection of an airfoil flutter condition. A gear train reduces a rotational speed of a fan in the gas turbine engine relative to another portion of the gas turbine engine.

In a further non-limiting embodiment of the foregoing turbine engine assembly embodiment, the gear train is a planetary gear train.

In a further non-limiting embodiment of either of the foregoing turbine engine assembly embodiments, the planetary gear system includes orbiting planet gears.

In a further non-limiting embodiment of any of the foregoing turbine engine assembly embodiments, the planetary gear system includes non-orbiting planet gears.

In a further non-limiting embodiment of any of the foregoing turbine engine assembly embodiments, the gear train has a constant gear ratio.

In a further non-limiting embodiment of any of the foregoing turbine engine assembly embodiments, the gear train reduces the rotational speed of the fan relative to a shaft of the gas turbine engine that is rotatably coupled to a low pressure compressor of the gas turbine engine.

In a further non-limiting embodiment of any of the foregoing turbine engine assembly embodiments, the variable area fan nozzle moveable between a first position having a first discharge airflow area and a second position having a second discharge airflow area greater than the first discharge airflow area.

In a further non-limiting embodiment of any of the foregoing turbine engine assembly embodiments, an actuator assembly is in communication with the controller and operable to move the variable area fan nozzle between the first position and the second position.

The various features and advantages of this invention will become apparent to those skilled in the art from the following detailed description. The drawings that accompany the detailed description are briefly described below.

DETAILED DESCRIPTION OF THE PREFERRED EMBODIMENT

Figure 1:
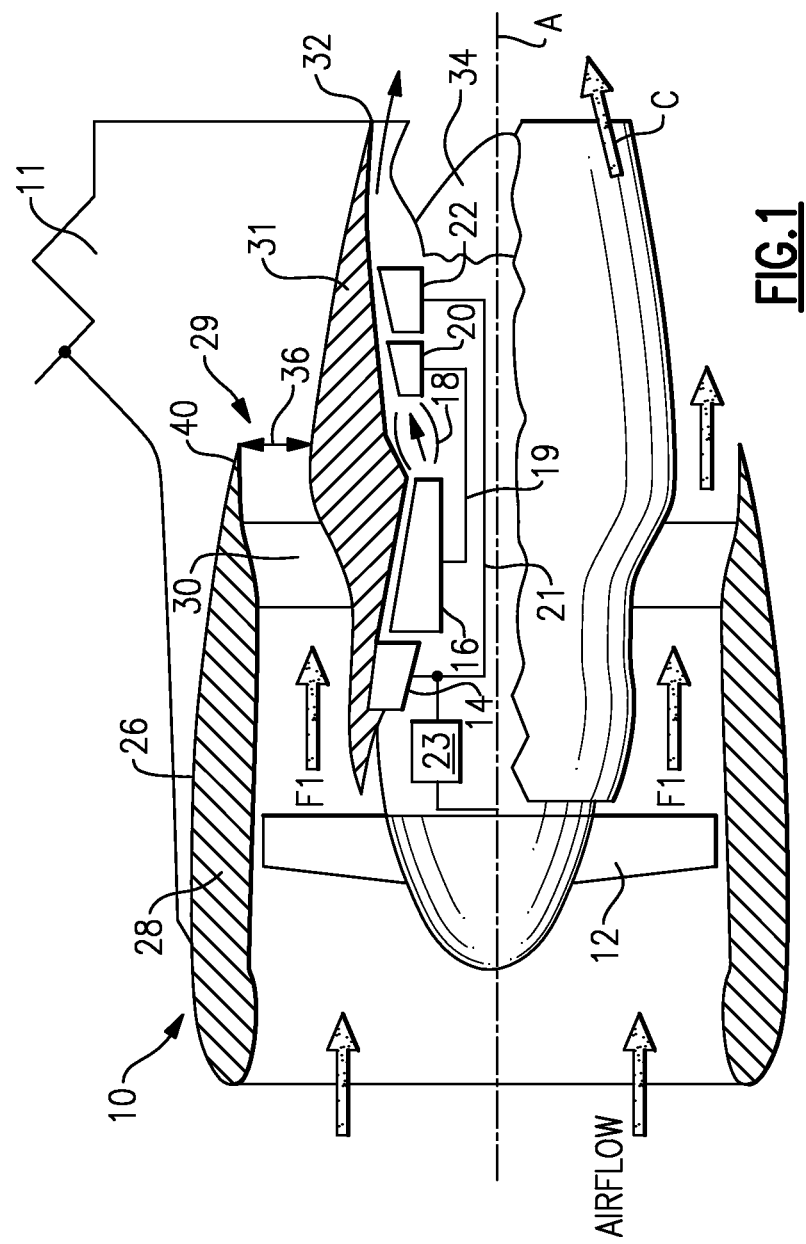
FIG. 1 illustrates a general partial cut-away view of a gas turbine engine.

FIG. 1 illustrates a gas turbine engine 10 which suspends from a pylon 11 and may include (in serial flow communication) a fan section 12, a low pressure compressor 14, a high pressure compressor 16, a combustor 18, a high pressure turbine 20 and a low pressure turbine 22. During operation, air is pulled into the gas turbine engine 10 by the fan section 12, is pressurized by the compressors 14, 16, and is mixed with fuel and burned in the combustor 18. Hot combustion gases generated within the combustor 18 flow through the high and low pressure turbines 20, 22, which extract energy from the hot combustion gases.

In a two spool design, the high pressure turbine 20 utilizes the extracted energy from the hot combustion gases to power the high pressure compressor 16 through a high speed shaft 19, and a low pressure turbine 22 utilizes the energy extracted from the hot combustion gases to power the low pressure compressor 14 and the fan section 12 though a low speed shaft 21. However, the invention is not limited to the two spool gas turbine architecture described and may be used with other architectures such as a single spool axial design, a three spool axial design and other architectures. That is, the present invention is applicable to any gas turbine engine, and to any application.

The example gas turbine engine 10 is in the form of a high bypass ratio turbofan engine mounted within a nacelle 26, in which a significant amount of the air pressurized by the fan section 12 bypasses the core engine for the generation of propulsion thrust. The nacelle 26 partially surrounds a fan casing 28 and an engine casing 31. The example illustrated in FIG. 1 depicts a high bypass flow arrangement in which approximately 80% of the airflow entering the fan section 12 may bypass the core engine via a fan bypass passage 30 which extends between the nacelle 26 and the core engine casing 31 for receiving and communicating a discharge airflow F1. The high bypass flow arrangement provides a significant amount of thrust for powering an aircraft.

In one example, the bypass ratio (i.e., the ratio between the amount of airflow communicated through the fan bypass passage 30 relative to the amount of airflow communicated through the core engine itself) is greater than ten, and the fan section 12 diameter is substantially larger than the diameter of the low pressure compressor 14. The low pressure turbine 22 has a pressure ratio that is greater than five, in one example. The engine 10 may include a gear train 23 which reduces the speed of the rotating fan section 12. The gear train 23 can be any known gear system, such as a planetary gear system with orbiting planet gears, a planetary system with non-orbiting planet gears, or other type of gear system. In the disclosed example, the gear train 23 has a constant gear ratio. It should be understood, however, that the above parameters are only exemplary of a contemplated geared turbofan engine. That is, the invention is applicable to a traditional turbofan engine as well as other engine architectures.

The discharge airflow F1 is communicated within the fan bypass passage 30 and is discharged from the engine 10 through a variable area fan nozzle (VAFN) 40 defined radially between the nacelle 26 and the core engine casing 31. Core exhaust gases C are discharged from the core engine through a core exhaust nozzle 32 defined between the core engine casing 31 and a center plug 34 defined coaxially therein around a longitudinal centerline axis A of the gas turbine engine 10.

In one example, the VAFN 40 concentrically surrounds the core engine casing 31 near an aftmost segment 29 of the nacelle 26. However, the VAFN 40 may be positioned at other locations of the engine 10. A discharge airflow area 36 is associated with the VAFN 40 and extends between the VAFN 40 and the core engine casing 31 for axially discharging the fan discharge airflow F1.

Figure 2:
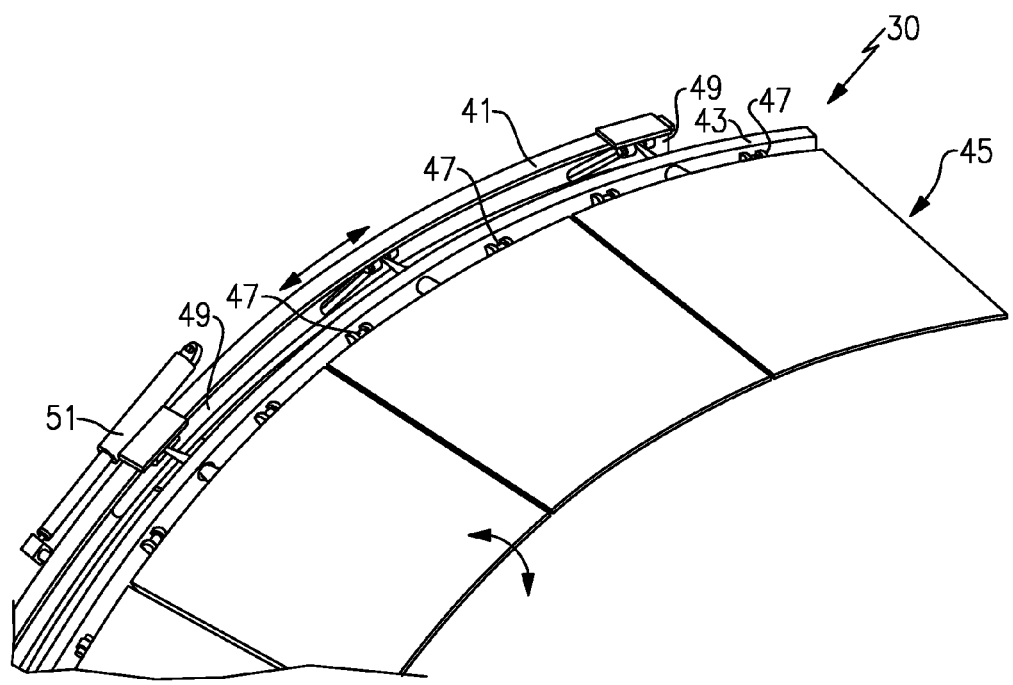
FIG. 2 is a perspective view of a section of a variable area fan nozzle (VAFN)

FIG. 2 illustrates the components of the VAFN 40. This structure is exemplary only, and, as other embodiments would similarly vary the discharge airflow area 36, will only be briefly discussed herein. The VAFN 40 generally includes a synchronizing ring 41, a static ring 43 and at least one flap assembly 45. Other VAFN actuation mechanisms may be used. The flap assembly 45 is pivotally mounted to the static ring 43 at multiple hinges 47 and linked to the synchronizing ring 41 through a linkage 49. An actuator assembly 51 selectively rotates the synchronizing ring 41 relative to the static ring 43 to adjust the flap assembly 45 through the linkage 49. The radial movement of the synchronizing ring 41 is converted to tangential movement of the flap assembly 45 to vary the discharge airflow area 36 of the VAFN 40, as is further discussed below.

Figure 3:
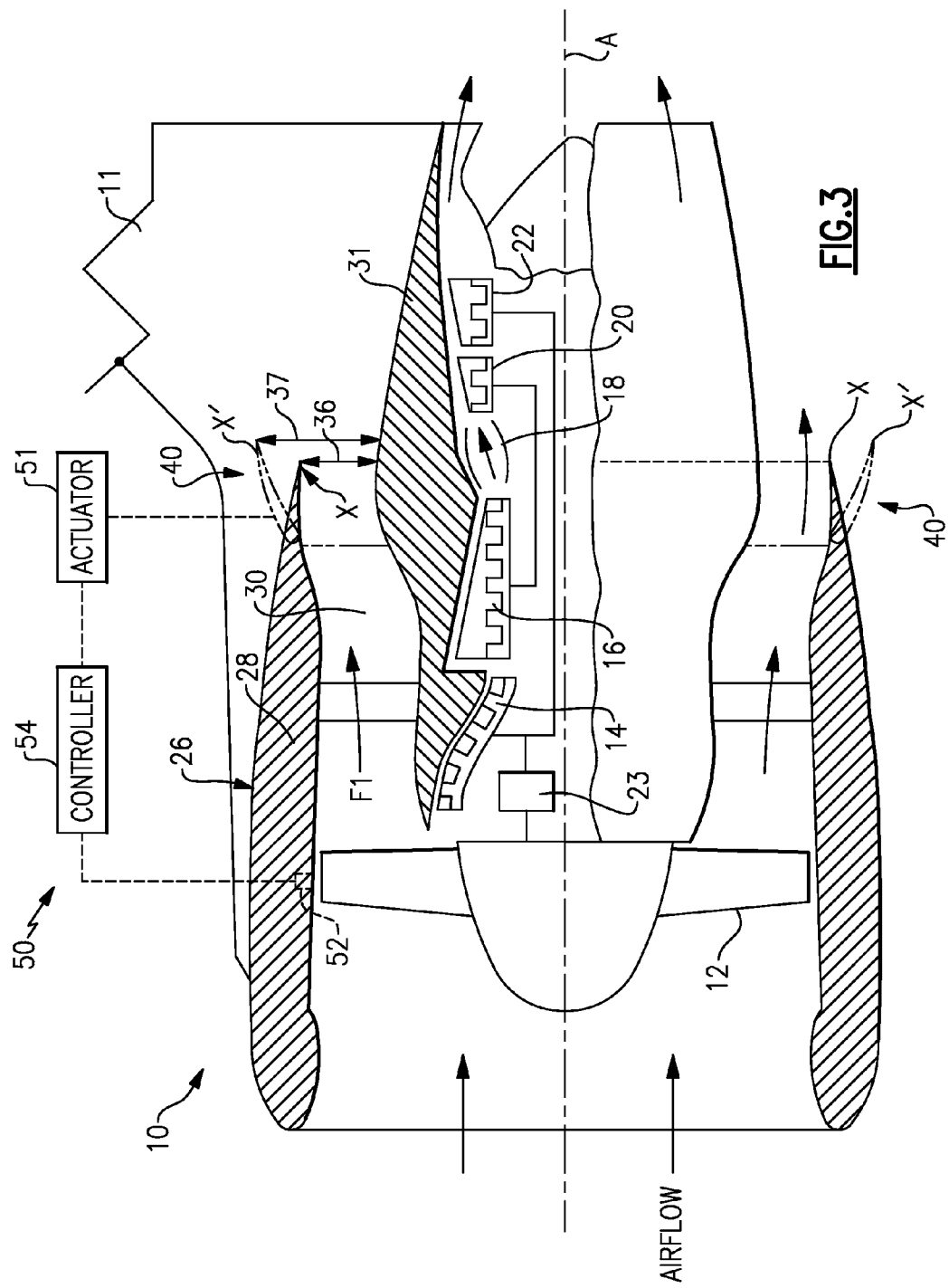
FIG. 3 is a schematic view of an example gas turbine engine having a variable area fan nozzle (VAFN)

FIG. 3 illustrates a flutter sensing system 50 of the gas turbine engine 10. The discharge airflow area 36 may be influenced during certain flight conditions, such as flutter conditions, by opening or closing the VAFN 40. Flutter conditions represent self-induced oscillations. Flutter conditions are caused by unsteady aerodynamic conditions such as the interaction between adjacent airfoils. During flutter, aerodynamic forces couple with each airfoil's elastic and inertial forces, which may increase the kinetic energy of each airfoil and produce negative damping. The negative damping is enhanced where adjacent airfoils begin to vibrate together.

In one example, the VAFN 40 is moveable between a first position X and a second position X' (represented by phantom lines). A discharge airflow area 37 of the second position X' is greater than the discharge airflow area 36 of the first position X.

The VAFN 40 is selectively moved to the second position X' to control the air pressure of the discharge airflow F1 within the fan bypass passage 30. For example, closing the VAFN 40 (i.e., moving the VAFN to the first position X) reduces the discharge airflow area which restricts the fan airflow F1 and produces a pressure build up (i.e., an increase in air pressure) within the fan bypass passage 30. Opening the VAFN 40 to the second position X' increases the discharge airflow area, allowing additional fan airflow, which reduces the pressure build up (i.e., a decrease in air pressure) within the fan bypass passage 30. That is, opening the VAFN 40 creates additional thrust power for the gas turbine engine 10.

The flap assemblies 45 (See FIG. 2) of the VAFN 40 are moved from the first position X to the second position X' in response to detecting a flutter condition of the gas turbine engine 10, in one example. In another example, the VAFN 40 is moved in response to detecting a cross-wind condition. However, it should be understood that the VAFN 40 may additionally be actuated in response to other operability conditions such as take-off or ground operations.

The flutter sensing system 50 is a closed-loop system and includes a sensor 52 and a controller 54. The sensor 52 actively and selectively detects the flutter condition and communicates with the controller 54 to move the VAFN 40 between the first condition X and the second position X' or any intermediate position via the actuator assemblies 51. Of course, this view is highly schematic. In one example, the sensor 52 is a time of arrival type sensor. A time of arrival sensor times the passage (or arrival time) of an airfoil as the airfoil passes a fixed, case-mounted sensor as the airfoil rotates about the engine longitudinal centerline axis A. In the example shown in FIG. 3, the arrival time of the fan section 12 airfoils 60 are timed by the sensor 52. Of course, other airfoils may similarly be timed. The controller 54 is programmed to differentiate between which airfoil arrival times correlate to a flutter condition and which airfoil arrival times correlate to non-flutter conditions.

It should be understood that the sensor 52 and the controller 54 are programmable to detect flutter conditions or other conditions. A person of ordinary skill in the art having the benefit of the teachings herein would be able to select an appropriate sensor 52 and program the controller 54 with the appropriate logic to communicate with the sensor 52 and the actuator assembly 51 to move the VAFN 40 between the first position X and the second position X' or any intermediate position in response to a flutter condition or any other condition.

The VAFN 40 is returned to the first position X from the second position X', which is otherwise indicated when the flutter conditions subside. In one example, the sensor 52 communicates a signal to the controller 54 where the flutter conditions are no longer detected by the sensor 52. Therefore, the efficiency of the gas turbine engine 10 is improved during both flutter and non-flutter conditions. Also, airfoil damage due to continued operation in a flutter condition is reduced.

Figure 4:
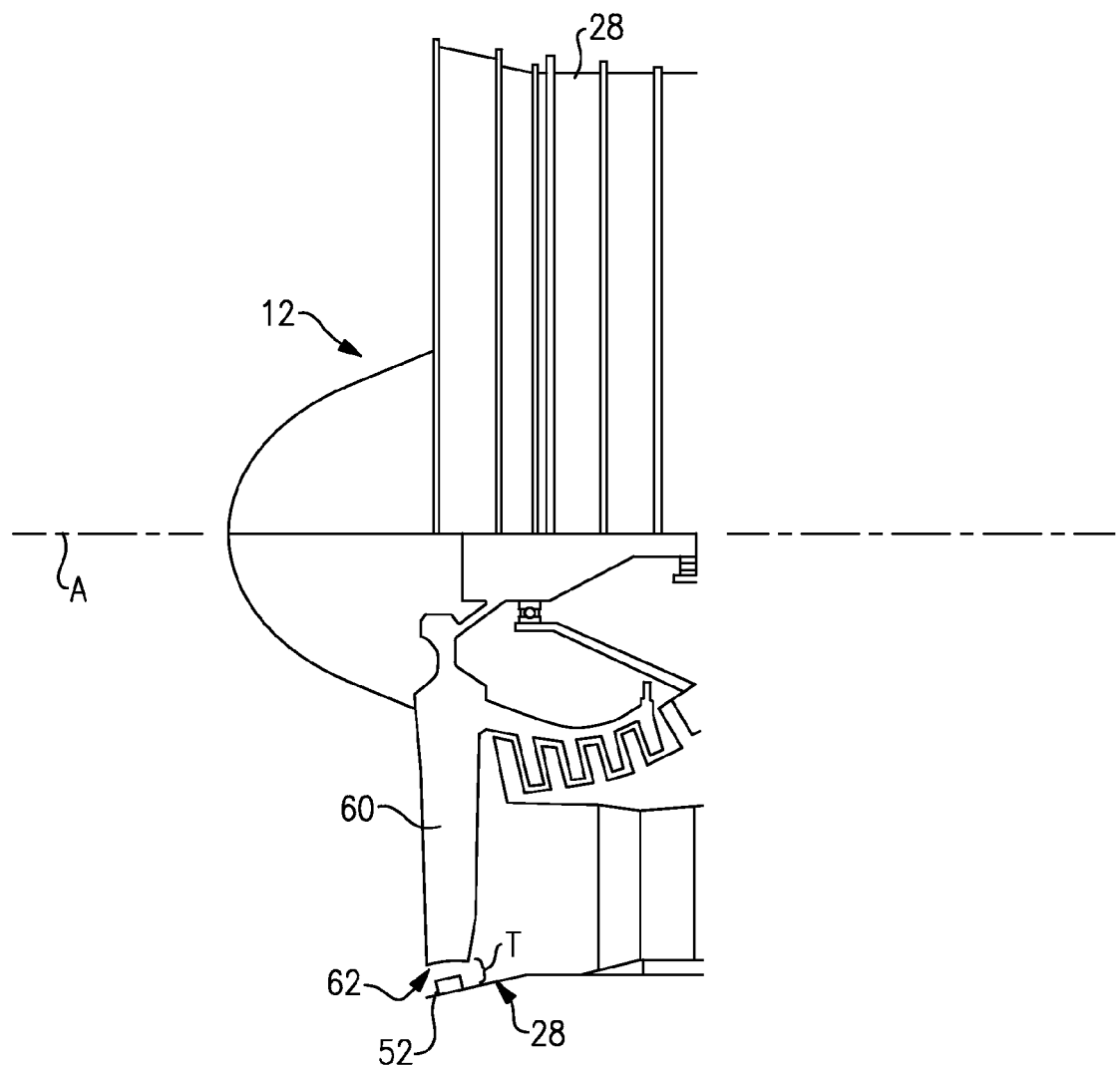
FIG. 4 illustrates a partial cut-away view of a fan section of the gas turbine engine.

FIG. 4 illustrates an example mounting location for the sensor 52 of the flutter sensing system 50. In one example, the sensor 52 is mounted to the fan casing 28 which surrounds the fan section 12. In another example, the sensor 52 is mounted directly adjacent to a blade tip area T of the fan section 12. The blade tip area T of the fan section 12 is the area of the fan casing 28 which is directly adjacent to the tips 62 of each airfoil 60 (only one shown in FIG. 4) of the fan section 12 as the airfoils 60 are rotated about the engine centerline axis A. In yet another example, multiple sensors 52 are circumferentially disposed about the core engine casing 31 adjacent to the blade tip area T of each airfoil 60. The sensor 52 may also be mounted adjacent to the blade tip area of the airfoils of the compressor sections 14, 16 or the turbine sections 20, 22.

The foregoing description shall be interpreted as illustrative and not in any limiting sense. A worker of ordinary skill in the art would recognize that certain modifications would come within the scope of this invention. For that reason, the following claims should be studied to determine the true scope and content of this invention.

What is claimed is:

1. A gas turbine engine assembly, comprising:
   a fan casing within a nacelle;
   a variable area fan nozzle; and
   a controller is operable to move the variable area fan nozzle to influence a discharge airflow area associated with the variable area fan nozzle in response to an airfoil flutter condition,
   wherein a gear train reduces a rotational speed of a fan in the gas turbine engine relative to another portion of the gas turbine engine.

2. The gas turbine engine assembly of claim 1, wherein the gear train is a planetary gear train.

3. The gas turbine engine assembly of claim 2, wherein the planetary gear system includes orbiting planet gears.

4. The gas turbine engine assembly of claim 2, wherein the planetary gear system includes non-orbiting planet gears.

5. The gas turbine engine assembly of claim 1, wherein the gear train has a constant gear ratio.

6. The gas turbine engine assembly of claim 1, wherein the gear train reduces the rotational speed of the fan relative to a shaft of the gas turbine engine that is rotatably coupled to a low pressure compressor of the gas turbine engine.

7. The gas turbine engine assembly of claim 1, including a sensor that detects the airfoil flutter condition.

8. The gas turbine engine assembly of claim 7, wherein the sensor is mounted to the fan casing adjacent to a blade tip area of a fan section.

9. The gas turbine engine assembly of claim 1, wherein the airfoil flutter condition comprises self-induced oscillations simultaneously experienced by adjacent airfoils of the gas turbine engine system.

10. The gas turbine engine assembly of claim 1, wherein the controller influences the discharge airflow area by moving the variable area fan nozzle between a first position having a first discharge airflow area and a second position having a second discharge airflow area greater than the first discharge airflow area in response to the airfoil flutter condition.

11. The gas turbine engine assembly of claim 1, wherein the discharge airflow area extends between the variable area fan nozzle and a core engine casing.

12. The gas turbine engine assembly as recited in claim 1, wherein said variable area fan nozzle includes a synchronizing ring, a static ring and at least one flap assembly.

13. The gas turbine engine assembly as recited in claim 12, wherein said at least one flap assembly is pivotally mounted to said static ring with a hinge and is linked to said synchronizing ring through a linkage.

14. The gas turbine engine assembly as recited in claim 1, wherein said airfoil flutter condition is associated with an airfoil of a fan section of a gas turbine engine.

15. The gas turbine engine assembly as recited in claim 1, wherein said variable area fan nozzle is moved between a first position and a second position that is radially outward from said first position in response to the detection of said airfoil flutter condition.

16. The gas turbine engine assembly as recited in claim 1, wherein the variable area fan nozzle is located radially outward from a core engine exhaust nozzle.

17. A gas turbine engine, comprising:
   a nacelle;
   a fan casing within the nacelle;
   a variable area fan nozzle moveable to influence a discharge airflow area associated with the variable area fan nozzle;
   a fan section within the fan casing;
   a compressor section and a turbine section positioned downstream of the fan section;
   a combustor section positioned between the compressor section and the turbine section;
   a controller operable to move the variable area fan nozzle in response to an airfoil flutter condition,
   wherein a gear train reduces a rotational speed of a fan in the gas turbine engine relative to another portion of the gas turbine engine.

18. The gas turbine engine assembly of claim 17, wherein the gear train is a planetary gear train.

19. The gas turbine engine assembly of claim 18, wherein the planetary gear system includes orbiting planet gears.

20. The gas turbine engine assembly of claim 18, wherein the planetary gear system includes non-orbiting planet gears.

21. The gas turbine engine assembly of claim 17, wherein the gear train has a constant gear ratio.

22. The gas turbine engine assembly of claim 17, wherein the gear train reduces the rotational speed of the fan relative to a shaft of the gas turbine engine that is rotatably coupled to a low pressure compressor of the gas turbine engine.

23. The gas turbine engine as recited in claim 17, wherein the variable area fan nozzle moveable between a first position having a first discharge airflow area and a second position having a second discharge airflow area greater than the first discharge airflow area.

24. The gas turbine engine as recited in claim 23, comprising an actuator assembly in communication with the controller and operable to move the variable area fan nozzle between the first position and the second position.

25. The gas turbine engine assembly as recited in claim 17, wherein said airfoil flutter condition is associated with an airfoil of a fan section of a gas turbine engine.

* * * * *